United States Patent [19]

Moss

[11] Patent Number: 4,729,532
[45] Date of Patent: Mar. 8, 1988

[54] SAFETY VALVE ANCHORING DEVICE

[76] Inventor: Billy Moss, Rte. 3 Box 111A, Franklin, Tenn. 37064

[21] Appl. No.: 4,641

[22] Filed: Jan. 20, 1987

Related U.S. Application Data

[63] Continuation of Ser. No. 714,106, Apr. 23, 1985, abandoned.

[51] Int. Cl.⁴ .............................................. F16L 3/08
[52] U.S. Cl. ................................ 248/74.1; 248/231.2
[58] Field of Search .......... 248/71, 56, 231.2, 217.2, 248/74.1, 65, 57

[56] References Cited

U.S. PATENT DOCUMENTS

| | | | |
|---|---|---|---|
| 2,140,861 | 12/1938 | Steketee | 248/57 X |
| 2,461,794 | 2/1949 | Williams | 248/57 |
| 2,670,919 | 3/1954 | Esoldi | 248/57 X |
| 2,713,983 | 7/1955 | Kay | 248/57 |
| 2,714,496 | 8/1955 | Doyle | 248/65 X |
| 2,732,158 | 1/1956 | Haverlee | 248/217.2 |
| 2,917,804 | 12/1959 | Barron | 248/57 X |
| 3,162,413 | 12/1964 | Hexdall | 248/217.2 X |
| 3,285,553 | 11/1966 | Hexdall | 248/71 |
| 4,059,872 | 11/1977 | Delesandri | 248/74.1 X |
| 4,518,141 | 5/1985 | Parkin | 248/57 X |

FOREIGN PATENT DOCUMENTS 1158661 7/1969 United Kingdom .............. 248/74.1

Primary Examiner—Ramon S. Britts
Assistant Examiner—David M. Purol
Attorney, Agent, or Firm—Steele, Gould & Fried

[57] ABSTRACT

Anchoring device for safety or release valve in gasoline pump line made up of a U-bolt, nuts and washers therefor, a bar-type clamp plate, and a tubular member with threaded extensions at both ends thereof, said U-bolt in association with said clamp plate and tubular member being adapted to hold said safety or release valve in a relatively immobile and shockproof position.

4 Claims, 4 Drawing Figures

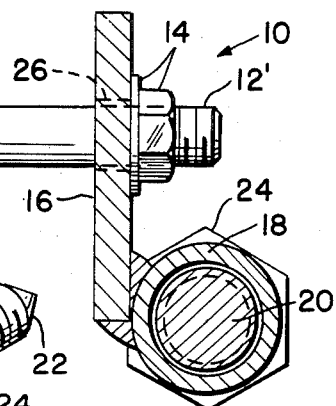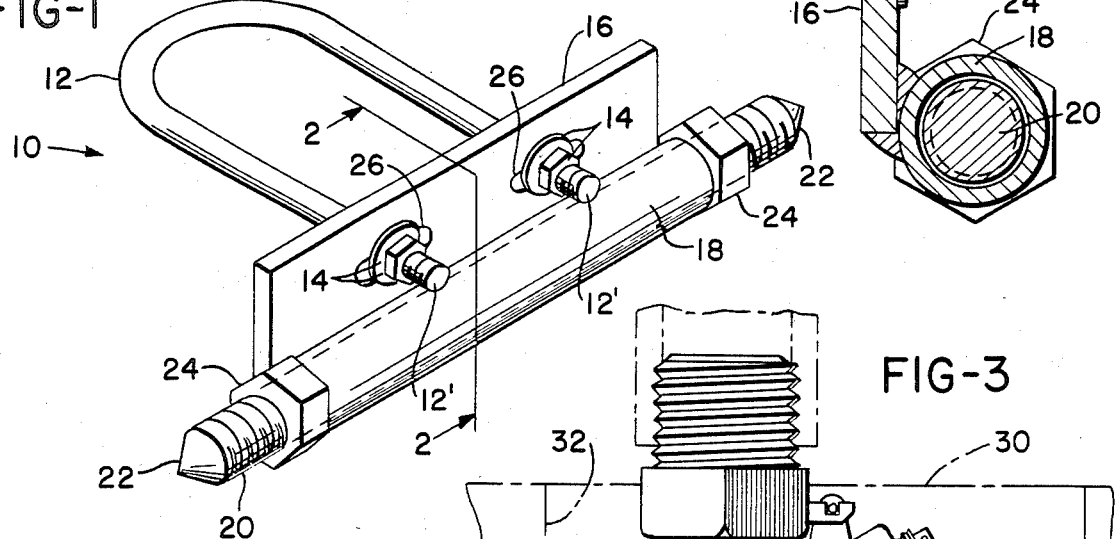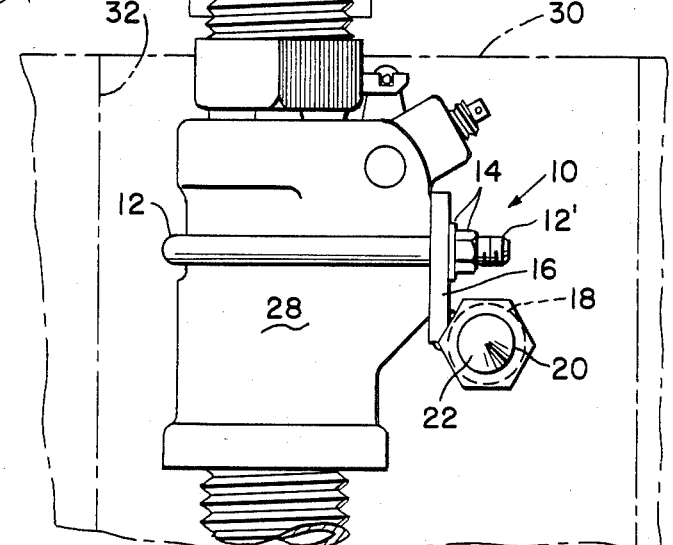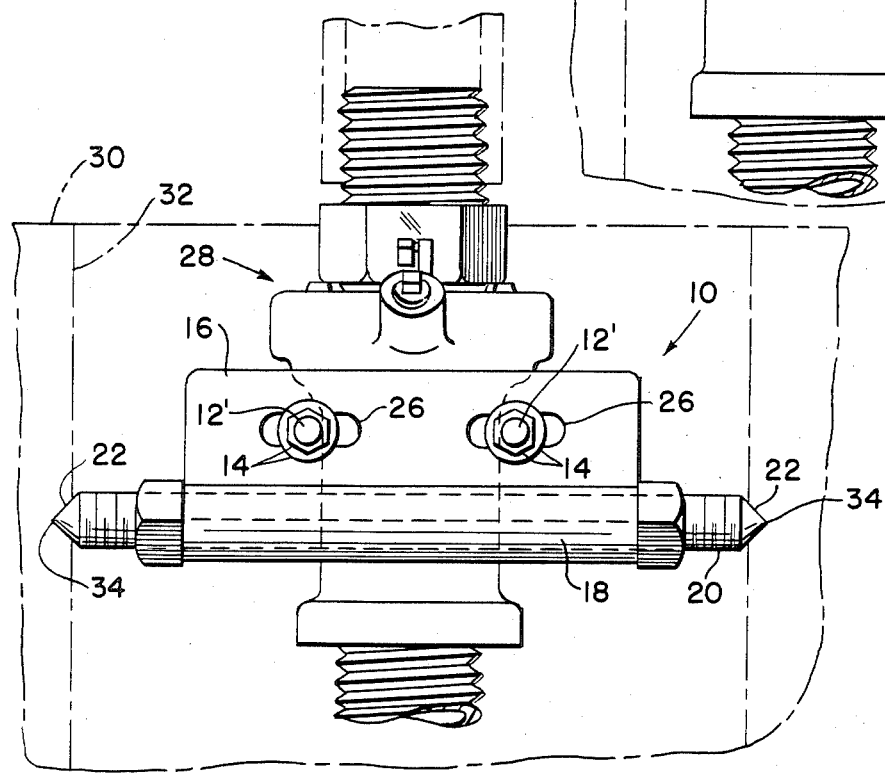

SAFETY VALVE ANCHORING DEVICE

This is a continuation of application Ser. No. 714,106, filed Apr. 23, 1985, now abandoned.

BACKGROUND OF THE INVENTION

1. Field of the Invention

This invention relates to an anchoring or securing device. More particularly, it relates to a U-bolt device for holding a shear valve in place securely and preventing it from being broken with a possible rupture in a gasoline line.

2. Description of the Prior Art

Gasoline lines from an underground tank and leading to a gasoline pump at a filling station conventionally have a shear valve or safety valve at the ground surface subject to breaking up being hit or run over by a gasoline delivery truck or other vehicle. It is possible to rupture the gasoline line and then have the gasoline escaping catch fire and explode. Presently existing anchoring devices still often permit the safety valve to be pulled out of place or broken.

SUMMARY OF THE INVENTION

After extended investigation I have developed an anchoring device that is able to hold the safety valve securely in place even when hit by a truck or the like and to avoid the possibility of a severe fire or explosion resulting from the gas line being ruptured at the valve location. The principal components of my anchoring device include a U-clamp or U-bolt, a clamp plate or bar, a tubular member having a threaded stud at each end thereof and an adjusting nut for use with each threaded stud, and nuts and washers for use at both ends of the U-bolt where it goes through adjusting slots in the clamp plate or bar:made to fit securely against the outside surface of the valve, with the U-bolt made to fit snugly around the valve where it is longest around, that is, where the distance around its outside periphery is the greatest.

For a better understanding of my invention and of its use, reference will now be made to the drawing, which represents a preferred embodiment of the invention.

BRIEF DESCRIPTION OF THE DRAWING

In the drawing,

FIG. 1 is a perspective view of the anchoring device of my invention.

FIG. 2 is a section taken at 2—2 of FIG. 1.

FIG. 3 is a side elevation view showing the anchoring device of the invention in place against and around a valve.

FIG. 4 is a front view of the anchoring device and valve shown in FIG. 3.

DETAILED DESCRIPTION OF THE INVENTION

In the drawing;

The clamp assembly or anchoring device 10 of the invention is made up generally of U-bolt or U-clamp 12 having threads 12' at both ends thereof, clamp plate or clamp bar 16, an at least ¾" pit 18 having threaded studs 20, preferably with conical ends 22, and adjusting nuts 24 at both ends thereof, and a nut and washer set or group 14 (shown holding U-bolt 12 ends in place protruding through adjusting slots 26 in clamp plate or clamp bar 16 in FIG. 1).

As may be seen more readily from FIGS. 3 and 4, particularly FIG. 4, dispensing, safety, release, relief, shear or like valve 28 is doubly protected against damage because the threaded studs 20 are adjustable by nuts 24 (see FIGS. 1 and 2) so that end points 34 fit against and into the walls of underground cavity 32 in which the clamp assembly or anchoring device 10 holds the valve 28 snugly in place in the gasoline line (unnumbered), mostly below ground level or surface 30 of concrete.

While the invention has been described in terms of preferred embodiments thereof, the claims appended hereto are intended to encompass all embodiments which fall within the spirit of the invention.

Having thus described my invention and certain preferred embodiments thereof, I claim:

1. An anchoring device for securing a safety valve of the type having a flat side within a compartment having opposed side walls, the anchoring device comprising
   an elongate body,
     the body comprising a clamping portion and securing portion, the securing portion having a longitudinal axis and first and second ends, the clamping portion comprising an affixing section and a clamping section, the clamping portion affixing section being immovably affixed to the securing portion to form a horizontal junction in parallel alignment to the said longitudinal axis, the clamping section extending upwardly from the junction,
     the clamping portion clamping section being provided with a pair of spaced openings in spaced relation above the said junction, the clamping section having a planar face adapted for clamping engagement against the flat side of the safety valve;
   a clamp secured to the said clamping section for encircling the safety valve, the clamp having a U-shaped bend and first and second ends, each of the first and second ends of the clamp inserting through and being positioned within one of the said pair of spaced openings, the clamp defining a plane that is spaced from and does not intersect the said longitudinal axis of the securing portion of the body;
   extending means adjustably carried in at least one of the said securing portion ends to secure the anchoring device within the compartment,
     the extending means comprising a threaded stud and an affixed adjusting nut,
   whereby the extending means can be threadedly extended into contact with a compartment side wall in an extremely sturdy interengagement and whereby the anchoring device can rigidly secure the safety valve within the compartment.

2. The anchoring device of claim 1 wherein the clamping portion clamping section has a planar face and wherein the planar face is adapted to be held in clamping engagement against the said flat side of the valve by the clamp.

3. The anchoring device of claim 2 wherein the plane of the clamp intersects the said planar face of the clamping section at right angles.

4. The anchoring device of claim 1 wherein the first and second ends are threaded, the threaded first and second ends being positioned above the longitudinal axis of the securing portion.

* * * * *